(12) United States Patent
Kawaguchi

(10) Patent No.: US 11,326,644 B2
(45) Date of Patent: May 10, 2022

(54) BEARING ASSEMBLY

(71) Applicant: NTN Corporation, Osaka (JP)

(72) Inventor: Hayato Kawaguchi, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 17/276,405

(22) PCT Filed: Sep. 17, 2019

(86) PCT No.: PCT/JP2019/036342
§ 371 (c)(1),
(2) Date: Mar. 15, 2021

(87) PCT Pub. No.: WO2020/059695
PCT Pub. Date: Mar. 26, 2020

(65) Prior Publication Data
US 2022/0074449 A1     Mar. 10, 2022

(30) Foreign Application Priority Data

Sep. 19, 2018 (JP) .............................. JP2018-175035

(51) Int. Cl.
*F16C 19/06* (2006.01)
*F16C 35/06* (2006.01)
(Continued)

(52) U.S. Cl.
CPC ............ *F16C 33/586* (2013.01); *F16C 19/06* (2013.01); *F16C 35/067* (2013.01)

(58) Field of Classification Search
CPC ...... F16C 19/06; F16C 33/586; F16C 35/063; F16C 35/0635; F16C 35/067
See application file for complete search history.

(56) References Cited

U.S. PATENT DOCUMENTS 3,339,991 A * 9/1967 Howe, Jr. ............. F16C 35/067
                                                384/498
4,796,722 A * 1/1989 Kumagai ................. B60K 5/04
                                                180/297
(Continued)

FOREIGN PATENT DOCUMENTS

JP   2002-213471        7/2002
JP   2004116659 A  *  4/2004  ............ F16C 35/067
(Continued)

OTHER PUBLICATIONS

Extended European Search Report dated Sep. 29, 2021 in European Patent Application No. 19863354.7.
(Continued)

*Primary Examiner* — Phillip A Johnson
(74) *Attorney, Agent, or Firm* — Wenderoth, Lind & Ponack, L.L.P.

(57) ABSTRACT

A bearing assembly includes a rolling bearing having a bearing ring fitted to a mating member, i.e., a shaft or a housing, with a clearance fit. Of the bearing ring and the mating member, the bearing ring has a flank face that separates a fitting surface of the bearing ring across the entire width thereof. The flank face defines a radial gap between the bearing ring and the housing. In a load receiving region where the radial gap remains, a portion of the bearing ring which is deformed in a wave-shaped pattern is kept out of contact with the fitting surface of the housing. The wave-shaped deformation of the bearing ring does not act as traveling waves that cause creep of the bearing ring.

16 Claims, 6 Drawing Sheets

(51) Int. Cl.
*F16C 33/58* (2006.01)
*F16C 35/067* (2006.01)

(56) References Cited

U.S. PATENT DOCUMENTS

| | | | |
|---|---|---|---|
| 9,360,049 B2* | 6/2016 | Pabst | F16C 33/588 |
| 9,551,376 B2* | 1/2017 | Pabst | F16C 33/588 |
| 10,054,164 B2* | 8/2018 | Taniguchi | F16C 33/585 |

FOREIGN PATENT DOCUMENTS

| | | | |
|---|---|---|---|
| JP | 2009-174556 | 8/2009 | |
| JP | 2011226582 A * | 11/2011 | F16C 33/586 |
| JP | 2017-53420 | 3/2017 | |
| JP | 2017-137896 | 8/2017 | |
| JP | 2018-119580 | 8/2018 | |
| KR | 10-1360590 | 2/2014 | |
| WO | 2009/005009 | 1/2009 | |

OTHER PUBLICATIONS

Translation of International Preliminary Report on Patentability and Written Opinion of The International Searching Authority dated Mar. 23, 2021 in International (PCT) Application No. PCT/JP2019/036342.
International Search Report dated Dec. 3, 2019 in International (PCT) Application No. PCT/JP2019/036342.

* cited by examiner

BEARING ASSEMBLY

This invention relates to a bearing assembly including a rolling bearing disposed between a shaft and a housing.

BACKGROUND ART

A bearing ring of a rolling bearing that receives radial loads that act between a shaft and a housing is fitted on the outer periphery of the shaft or the inner periphery of the housing. Fitting surfaces formed on the bearing ring, and the shaft or the housing are ordinarily cylindrical surfaces. The fit between the fitting surface formed on the inner or outer periphery of the bearing ring and the fitting surface formed on the shaft or the housing is selected from among an interference fit, a normal fit and a clearance fit, depending on the load conditions, ease of assembly of the bearing assembly, etc. If the fit is a clearance fit, the bearing ring could creep, i.e., shift in the circumferential direction relative to the mating member to which the bearing ring is fitted, i.e., the shaft or the housing.

For example, in a bearing assembly in which a shaft of a vehicle transmission is supported on a housing via a rolling bearing, in order for the bearing to be easily mounted in the housing, the outer bearing ring of the rolling bearing is fitted to the housing with a clearance fit. The clearance fit could result in creep of the outer bearing ring due, e.g., to unbalanced load distribution on the shaft in a low-load condition or during high-speed rotation.

It is known that creep is a phenomenon in which traveling waves that appear on the surface of the bearing ring move the bearing ring itself. That is, when loads from rolling elements are applied to the raceway surface of the bearing ring, the surface of the bearing ring protrudes at its portions right under the positions where the loads are applied, and waves form. Because, as the bearing rotates, the rolling elements revolve around the center of the bearing, the waves on the surface of the bearing ring become traveling waves. The traveling waves on the surface of the bearing ring behave in a manner similar to peristaltic motion in the circumferential and radial directions within the entire loaded region of the rolling bearing. Thus, the traveling waves tend to move the mating member in the direction opposite the revolving direction of the rolling elements. However, the traveling waves are instead pushed back due to the resistance of the mating member (the shaft or the housing), and as a result, creep occurs in which the bearing ring rotates in the same direction as the revolving direction of the rolling elements, namely the rotational direction of the bearing.

In order to prevent, of the inner and outer bearing rings of a rolling bearing, creep of the outer bearing ring, which is fitted to the housing with a clearance fit, the prior art proposes to form a circumferentially extending peripheral groove on the mating member, i.e., the housing. The peripheral groove is formed to divide, of the fitting surface of the mating member which continuously extends around the entire circumference of the mating member, its circumferential portion located in a radial load receiving region, into two axial sections. This peripheral groove serves as a relief groove in the radial load receiving region, thereby preventing creep.

However, in JP2017-137896A, the groove width of the peripheral groove formed on the mating member (housing) is substantially the same as the groove width of the raceway surface on the bearing ring. Further, the maximum depth of the peripheral groove is set to be not more than the maximum amount of deformation of the bearing ring due to radial loads applied to the rolling bearing. With such a peripheral groove, when a maximum radial load is applied to the rolling bearing between the shaft and the housing, and as result, maximum elastic deformation occurs on the fitting surface of the bearing ring which is deformed in a wave-shaped pattern right under the raceway surface, at the circumferentially central portion of the load receiving region, the fitting surface will contact the groove bottom of the peripheral groove of the mating member at the maximum elastically deformed portion (peak of the wave-shaped pattern) of the fitting surface, and will also relatively strongly come into contact with both side edges of the peripheral groove. Because the above-described traveling waves are received at these contact portions to some extent, there is a concern that such contact may allow creep of the bearing ring.

In view of these circumstances, an object of the present invention is, in a bearing assembly in which a bearing ring of the rolling bearing is fitted to the mating member, i.e., the shaft or the housing, with a clearance fit, to reduce creep of this bearing ring.

SUMMARY OF THE INVENTION

In order to achieve this object, the present invention provides a bearing assembly comprising a shaft, a housing surrounding the shaft, and a rolling bearing disposed between the shaft and the housing, wherein one of the shaft and the housing is a mating member, the rolling bearing includes a bearing ring fitted to the mating member with a clearance fit, and each of the bearing ring and the mating member has a fitting surface extending in a circumferential direction, wherein at least one of the bearing ring and the mating member has a flank face that separates the fitting surface of the at least one of the bearing ring and the mating member across an entire width of the fitting surface, and wherein the flank face is formed such that a radial gap remains between the bearing ring and the mating member in a load receiving region when a maximum radial load within a range of radial loads applied to the rolling bearing is applied.

In this arrangement, because at least one of the bearing ring and the mating member fitted to the bearing ring with an interference fit, i.e., the shaft or the housing, has a flank face that separates the fitting surface of the at least one of the bearing ring and the mating member across the entire width of the fitting surface, it is possible to define a radial gap between the bearing ring and the mating member so as to span the entire widths of their portions fitted to each other. The flank face is formed such that the radial gap remains between the bearing ring and the mating member in a load receiving region even when a maximum radial load within a range of radial loads applied to the rolling bearing is applied. Thus, in the region where the radial gap remains, even when the fitting surface of the bearing ring is deformed in a wave-shaped pattern, the bearing ring never contacts the mating member, and thus, such wave-shaped deformation never acts as traveling waves. For these reasons, compared with the arrangement of described in JP2017-137896A, in which a circumferentially extending peripheral groove is used to reduce creep, the arrangement of the present invention is more effective in reducing creep of the bearing ring.

Specifically, only the bearing ring preferably has the flank face. If the flank face is formed on the mating member, and if the flank face is not located in the load receiving region, the flank face will not exhibit the creep reducing effect. On the other hand, by forming the flank face only on the bearing ring to define the radial gap, even if the flank face is positioned in a region out of the direction of the load, when the bearing ring creeps for a certain distance, the flank face 5c enters the load receiving region, thus defining the above-described radial gap, and reducing creep of the bearing ring 5 thereafter.

Preferably, the mating member is the housing. In this configuration and in a bearing assembly of which the housing and the bearing ring are fitted together with a clearance fit, the flank face can be formed simply by cutting the outer periphery of the bearing ring to a non-perfect circular shape, while avoiding complexity of the shape of the housing.

Preferably, the flank face is shaped such that the radial depth of the flank face relative to the radial dimension of the fitting surface separated by the flank face is largest at a circumferentially central portion of the flank face, and such that the circumferentially farther away from the circumferentially central portion, the smaller the radial depth is. In this configuration, the wave-shaped deformation of the bearing ring becomes maximum at the circumferentially central portion of the load receiving region, and the farther away from the circumferentially central portion, the smaller the wave-shaped deformation is. As a result, the radial depth between the flank face and the fitting surface separated by the flank face is the largest at the circumferentially central portion of the flank face, and the circumferentially farther away from the circumferentially central portion, the smaller the radial depth is. This minimizes a reduction in wall thickness of one of the bearing ring and the mating member that defines the flank face.

Preferably, the flank face is smoothly and continuously connected to the fitting surface separated by the flank face. In this configuration, no corners (edges) form on the boundaries between the flank face and the fitting surface, so that it is possible to reduce the surface pressure between the bearing ring and the mating member, which contact each other at the above boundaries.

Advantages of the Invention

As described above, according to the present invention, by using the above-described structure, in a bearing assembly of which a bearing ring of a rolling bearing is fitted to the mating member, i.e., a shaft or a housing, it is possible to more effectively reduce creep of the bearing ring in the rotational direction of the bearing.

DETAILED DESCRIPTION OF THE INVENTION

The first embodiment of the present invention is described with reference to the attached drawings.

Figure 1:
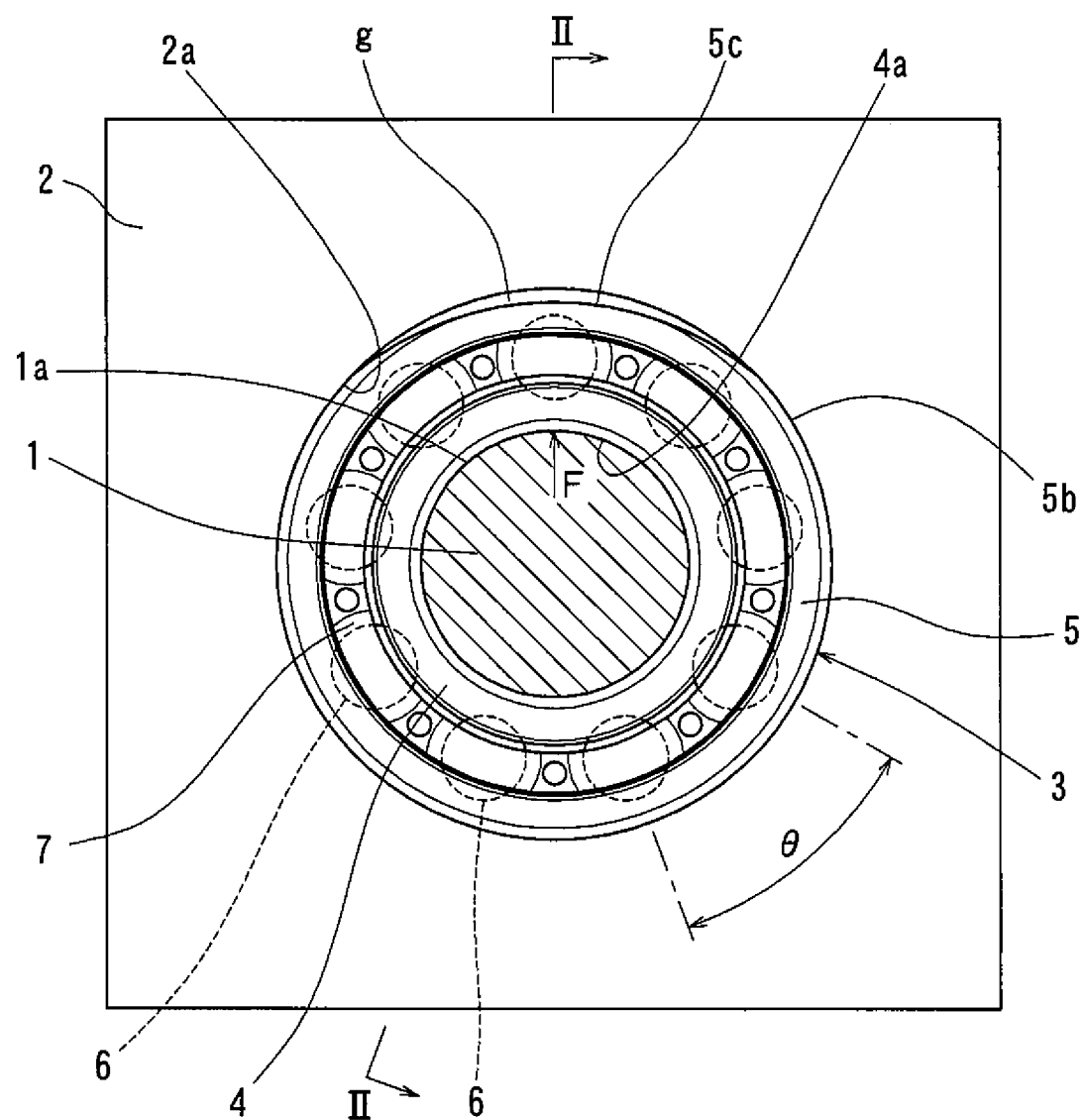
FIG. 1 is a front view of a bearing assembly according to a first embodiment of the present invention.
Figure 2:
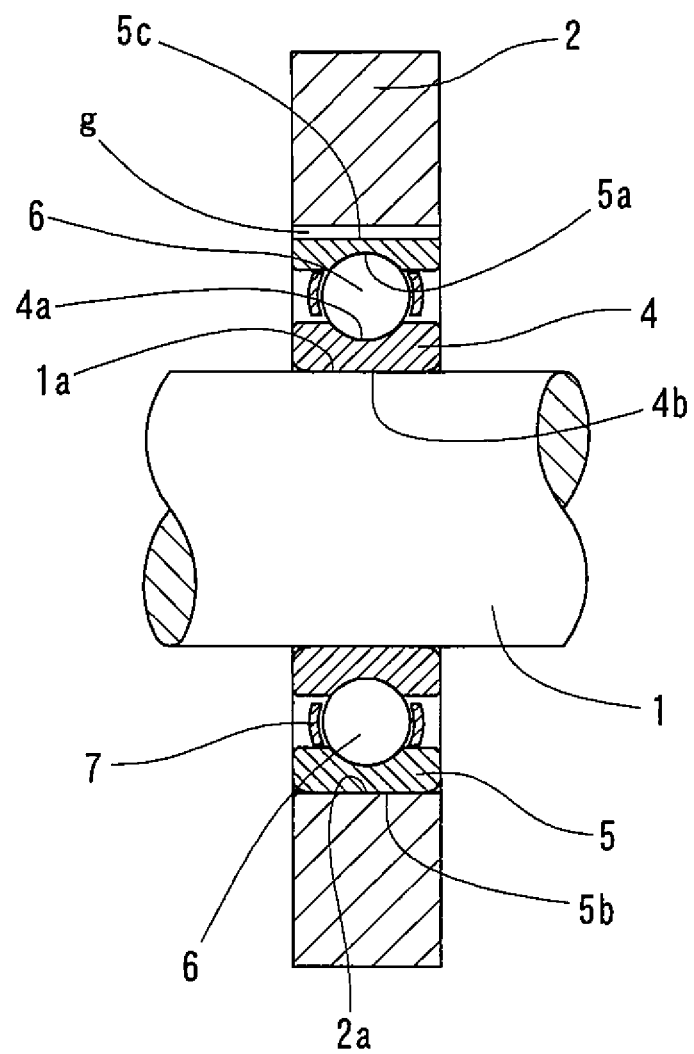
FIG. 2 is a sectional view taken along line II-II of FIG. 1.

As shown in FIGS. 1 and 2, the bearing assembly according to the first embodiment includes a shaft 1, a housing 2 surrounding the shaft 1, and a rolling bearing 3 disposed between the shaft 1 and the housing 2.

As used hereinbelow, in an ideal state in which the rotational center axis, on the blueprint, of the rolling bearing 3 coincides with the rotational center axis of the shaft 1, the terms "axial" and "axially" refer to the direction along the rotational center axes; the terms "circumferential" or "circumferentially" refer to the direction along a circumference around the rotational center axes, and the terms "radial" and "radially" refer to a direction perpendicular to the rotational center axes.

The shaft 1 rotates relative to the housing 2. The shaft 1 is, for example, a transmission shaft of a vehicle transmission.

The shaft 1 has a fitting surface 1a extending in the circumferential direction. The fitting surface 1a is a cylindrical surface concentric with the rotational center axis of the shaft 1.

The housing 2 is stationary relative to the shaft 1, and radially supports the rolling bearing 3. The housing 2 is, for example, a partitioning wall formed as a portion of a transmission case of a vehicle.

The housing 2 has a fitting surface 2a extending in the circumferential direction. The fitting surface 2a is a cylindrical surface surrounding, from outside, the fitting surface 1a of the shaft 1. The fitting surface 2a has a center axis concentric with the rotational center of the shaft 1.

The rolling bearing 3 rotatably supports the shaft 1 relative to the housing 2 to receive radial loads acting between the shaft 1 and the housing 2. This bearing assembly is intended to be used in an environment where radial loads in one direction is applied to the bearing assembly. During operation of the bearing assembly, such radial loads act on the rolling bearing 3 between the fitting surface 1a of the shaft 1 and the fitting surface 2a of the housing 2.

The rolling bearing 3 includes an inner bearing ring 4 mounted to the shaft 1; an outer bearing ring 5 mounted to the housing 2; a plurality of rolling elements 6 disposed between both of these bearing rings 4 and 5; and a cage 7 keeping circumferential distances between the rolling elements 6. The rolling bearing 3 shown is a deep groove ball bearing.

The inner bearing ring 4 is an annular bearing component having a raceway surface 4a extending in the circumferential direction on the outer periphery thereof, and having, on the inner periphery thereof, a fitting surface 4b extending in the circumferential direction. The raceway surface 4a is capable of contacting the rolling elements 6 at nominal contact angles of 0° around the entire circumference of the raceway surface 4a. The fitting surface 4b is a cylindrical surface concentric with the fitting surface 1a of the shaft 1. The width (axial length) of the fitting surface 4b is constant around the entire circumference of the fitting surface 4b.

The fitting surface 4b of the inner bearing ring 4 and the fitting surface 1a of the shaft 1 are fitted together with an interference fit. Due to the interference fit, the inner bearing ring 4 is fixed to the shaft 1 so as to rotate in unison with the shaft 1.

The outer bearing ring 5 is an annular bearing component having a raceway surface 5a extending in the circumferential direction on the inner periphery thereof, and having, on the outer periphery thereof, a fitting surface 5b extending in the circumferential direction. The raceway surface 5a is capable of contacting the rolling elements 6 at nominal contact angles of 0° around the entire circumference of the raceway surface 5a.

Of the shaft 1 and the housing 2, the housing 2 is a mating member to which the outer bearing ring 5 is fitted with a clearance fit.

Figure 3:
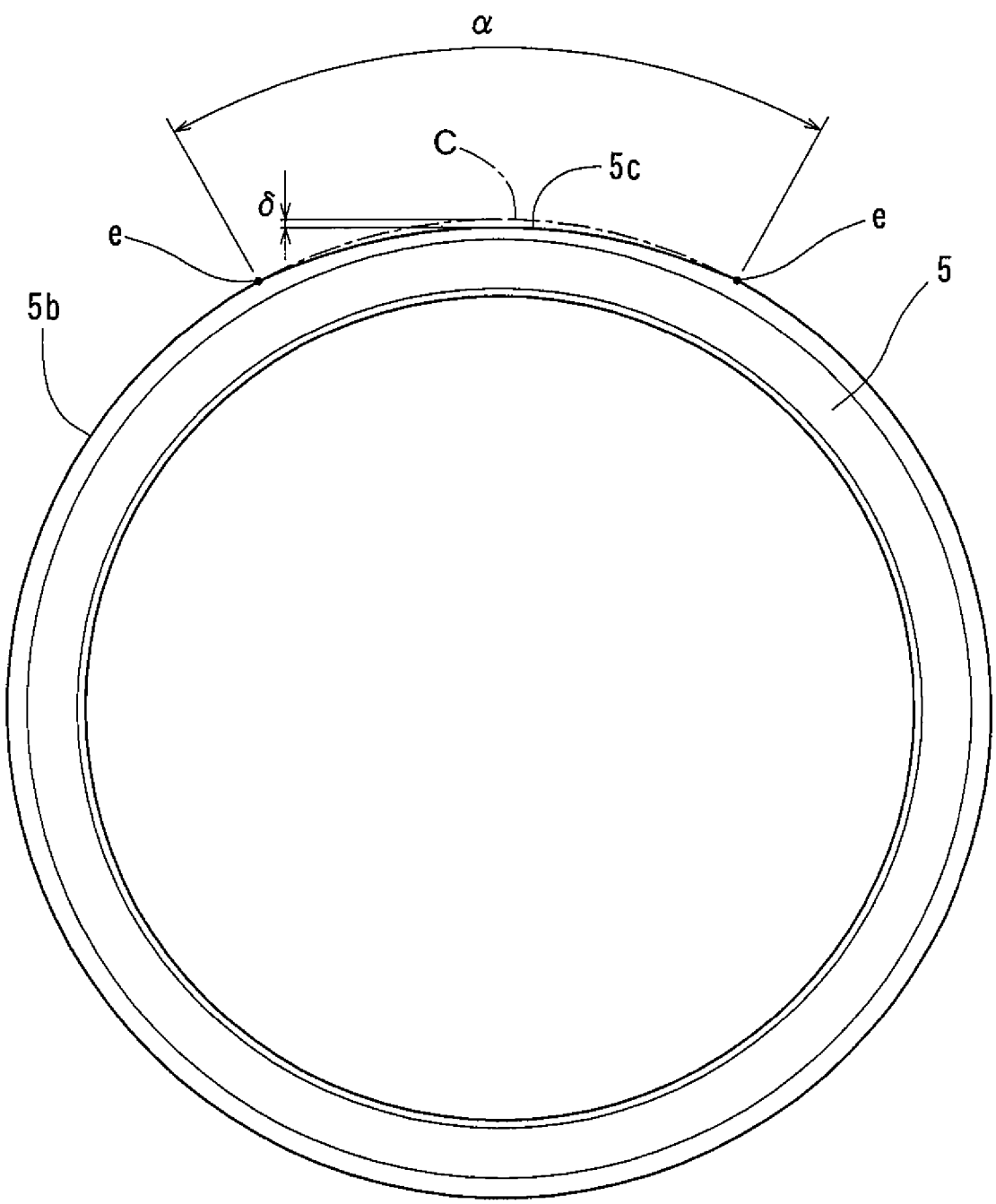
FIG. 3 is a front view of an outer bearing ring according to the first embodiment.
Figure 4:
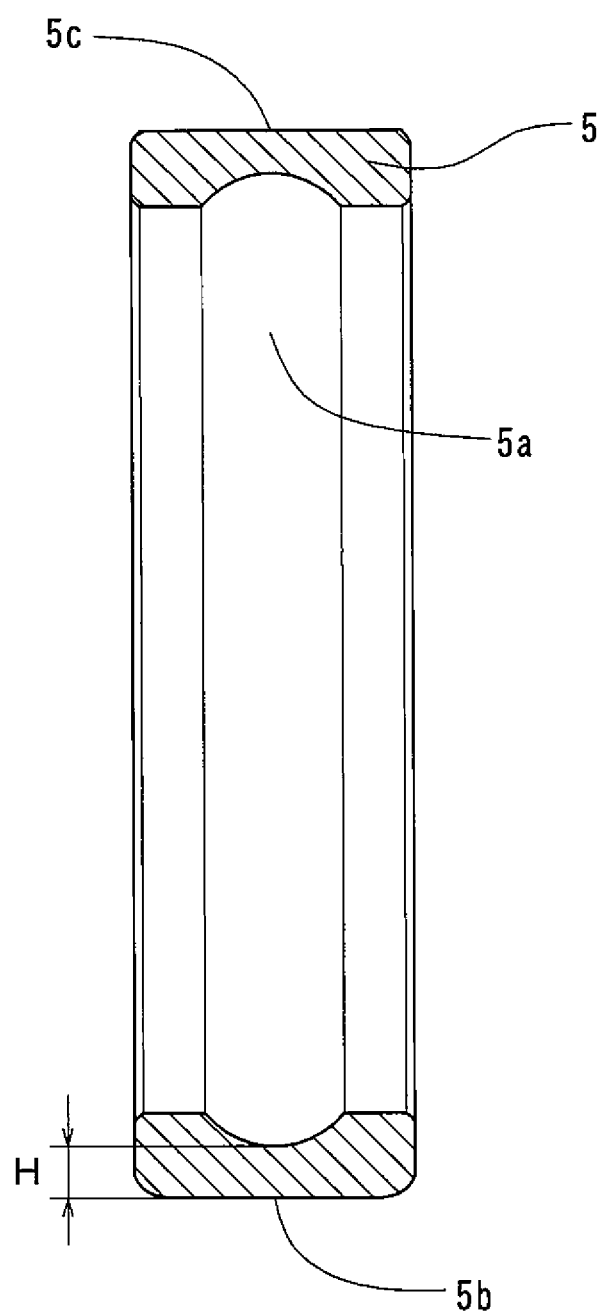
FIG. 4 is a sectional view of the outer bearing ring shown in FIG. 3.

FIGS. 3 and 4 show the shape of the outer bearing ring 5 in a natural state in which no load is applied thereto. The fitting surface 5b of the outer bearing ring 5 is a circular arc-shaped surface, and defines the outer diameter of the outer bearing ring 5. The diameter of the fitting surface 5b corresponds to the diameter of the imaginary circle C circumscribing the fitting surface 5b. The circular arc forming the fitting surface 5b is concentric with the fitting surface 4b of the inner bearing ring 4, shown in FIGS. 1 and 2. The width (axial length) of the fitting surface 5b is constant around the entire circumference of the fitting surface 5b.

The diameter of the fitting surface 5b of the outer bearing ring 5 is smaller than the diameter of the fitting surface 2a of the housing 2. The fitting surface 5b of the outer bearing ring 5 and the fitting surface 2a of the housing 2 are brought into contact with each other by a radial load applied to the rolling bearing 3 from the shaft 1.

Of the outer bearing ring 5 and the housing 2, only the outer bearing ring 5 has a flank face 5c that separates the fitting surface 5b of the bearing ring 5 across the entire width of the fitting surface 5b. Because the flank face 5c spans the entire width of the fitting surface 5b, it completely separates the fitting surface 5b in the circumferential direction.

As shown in FIG. 3, the flank face 5c is shaped such that it has a maximum radial depth δ, relative to the radial dimension of the fitting surface 5b, which is separated by the flank face 5c, at the circumferentially central portion of the flank face 5c, and such that the circumferentially farther away from the central portion, the smaller the radial depth is. The maximum radial depth δ corresponds to a radial distance between the imaginary circle C and the flank face 5c.

In the example shown, the flank face 5c is a substantially circular arc-shaped surface as seen in the axial direction, and is connected to both circumferential ends e of the fitting surface 5b, which is separated by the flank face 5c. The substantially circular arc-shaped surface has a radius of curvature larger than that of the fitting surface 5b, and has a center axis (center of curvature) at a position displaced from the center axis of the fitting surface 5b in one radial direction (downward in FIG. 3).

The circumferential length of the flank face 5c can be defined by the angle α around the rotational center axis of the shaft 1. This angle α, which corresponds to the circumferential length of the flank face 5c, shown in FIG. 3, may be set, for example, at $0 < \alpha \leq 2\theta$, where θ, see FIG. 1, is the pitch angle between the rolling elements 6. In order for the outer bearing ring 5 to have a shape which can reduce deflection and stress of the outer bearing ring 5 due to radial loads, the value α is preferably set at $0.5\theta \leq \alpha \leq \theta$.

The maximum radial depth δ of the flank face 5c, see FIG. 3, may be set at $0.005H \leq \delta \leq 0.1H$, where H is, as shown in FIG. 4, the minimum radial wall thickness of the outer bearing ring 5 between the raceway surface 5a and the fitting surface 5b of the outer bearing ring 5. In order for the outer bearing ring 5 to have a shape which can reduce deflection and stress of the outer bearing ring 5 due to radial loads, the maximum radial depth δ of the flank face 5c is preferably set at $0.01H \leq \delta \leq 0.05H$.

The flank face 5c provides, as seen in FIGS. 1 and 2, a radial gap g between the outer periphery of the outer bearing ring 5 and the fitting surface 2a of the housing 2. Because this radial gap g is defined by the flank face 5c which separates the fitting surface 5b defining the outer diameter of the outer bearing ring 5, across the entire width of the fitting surface 5b, the gap g spans the entire width of the fitting portion between the outer periphery of the outer bearing ring 5 and the inner periphery of the housing 2 (corresponding to the entire width of the fitting surface 5b). This means that the gap g is a space axially extending between the outer periphery of the outer bearing ring 5 and the fitting surface 2a of the housing 2, along the entire axial length thereof.

The flank face 5c is formed such that, when a maximum radial load F is applied to the rolling bearing 3, the radial gap g remains within a load receiving region between the outer periphery of the outer bearing ring 5 and the fitting surface 2a of the housing 2. The maximum radial load F is the largest radial load within the range of fluctuating radial loads applied to the rolling bearing 3 during operation of the bearing assembly.

The load receiving region of the rolling bearing 3, which receives a radial load, spans substantially half the circumference of the rolling bearing 3. The circumferential central portion of the load receiving region is a position corresponding to the direction of the radial load (corresponding to the position on the extension of the arrow indicating the radial load F in FIG. 1). The outer bearing ring 5 is elastically deformed by receiving the radial load on the raceway surface 5a via the rolling elements 6 in the load receiving region. At that time, in the load receiving region of the rolling bearing 3, the fitting surface 5b and the flank face 5c of the outer bearing ring 5 (especially portions right under the raceway surface 5a) are deformed in a wave-shaped pattern such that the wave at the circumferentially central portion of the load receiving region has a maximum height, and the farther away from the circumferentially central portion, the smaller the heights of the waves are.

The maximum radial depth δ, shown in FIG. 3, of the flank face 5c is set at a value larger than the maximum radial height of the wave-shaped deformation, in the load receiving region of the rolling bearing 3 when the maximum radial load F is applied. Also, the radial depth of the flank face 5c decreases gradually from the circumferentially central portion of the flank face 5c toward the ends e of the fitting surface 5b such that the amount of decrease thereof does not exceed the amount of decease of the radial height of the wave-shaped deformation corresponding to the circumferential position.

The radial gap g in FIG. 1 and the maximum radial depth δ in FIG. 3 are shown exaggerated. Actual heights of the waves of the wave-shaped deformation of the bearing ring 5 relative to the fitting surface 5b are on the order of several micrometers, at the most.

The outer bearing ring 5 is radially supported at contact areas of the fitting surface 5b that are located within the load receiving region of the rolling bearing 3, shown in FIG. 1, and in contact with the fitting surface 2a of the housing 2. At the contact areas, the fitting surface 5b contacts the fitting surface 2a at its portions slightly deformed in a wave-shaped pattern. Even when the maximum radial load F is applied to the rolling bearing 3, the reaction force from the portions of the fitting surface 2a that are slightly deformed in a wave-shaped pattern at the contact areas within the load receiving region is not large enough to cause creep of the bearing ring 5.

Because the radial gap g, see FIGS. 1 and 2, is defined by the above-defined flank face 5c, even when, with the maximum radial load F applied, the outer periphery (the fitting surface 5b and the flank face 5c) of the outer bearing ring 5 is deformed in a wave-shaped pattern within the load receiving region of the rolling bearing 3, the radial gap g still remains, and in the circumferential region where the radial gap g remains, the portions of the outer bearing ring 5 that are deformed in a wave-shaped pattern are incapable of contacting the fitting surface 2a of the housing 2. In other words, during operation of the rolling bearing, in the circumferential region where the radial gap g remains, the wave-shaped deformation on the outer periphery of the outer bearing ring 5 is kept out of contact with the fitting surface 2a of the housing 2. Therefore, wave-shaped deformation on the outer periphery of the outer bearing ring 5 within the load receiving region does not act as traveling waves that cause creep of the bearing ring 5. Thus, compared to a configuration in which, as in Patent Document 1, a maximum elastically deformed portion (wave-shaped deformed portion) of the bearing ring could contact a bottom or edges of a creep-reducing circumferential groove, the bearing assembly according to the present invention is capable of reducing creep of the bearing ring 5 more significantly.

Also, in this bearing assembly, of the outer bearing ring 5 and its mating member fitted to the bearing ring 5 with a clearance fit, i.e., the housing 2, only the bearing ring 5 has the flank face 5c, so that even if the flank face 5c is positioned in a region out of the direction of the fluctuating load, when the bearing ring creeps for a certain distance (one turn at the most), the flank face 5c enters the load receiving region, thus defining the above-described radial gap g, and reducing creep of the bearing ring 5 thereafter.

If the radial load applied to the rolling bearing is a stationary load, i.e., a load whose direction does not change in the circumferential direction, the flank face may be formed only on the mating member to define the above-described radial gap, or two such flank faces may be formed, respectively, on the mating member and the bearing ring to define the radial gap therebetween. In a stationary load environment, a predetermined creep-reducing effect is achievable by fitting together the bearing ring and the mating member such that the above-described radial gap is defined at a position corresponding to the load receiving region of the rolling bearing. However, if the flank face is formed on the mating member or housing 2, and if the flank face is erroneously not formed within the load receiving region, the creep reducing effect may not be obtained. In order to avoid this, the flank face 5c is preferably formed only on the bearing ring 5 to define the radial gap g.

In this bearing assembly, because, in the configuration in which the outer bearing ring 5 and the housing 2 are fitted together with a clearance fit, the flank face 5c is formed only on the bearing ring 5, the flank face 5c can be formed by simply cutting the outer periphery of the bearing ring 5 into a non-perfect circle, while avoiding complication of the shape of the housing 2. If, for example, the housing is formed as a portion of a transmission case, such a housing is formed in a mold. If a creep reducing circumferential groove as disclosed in JP2017-137896A is formed in such a housing, this circumferential groove is formed as an undercut, and makes the formation of the housing difficult. If the flank face 5c is formed only on the outer bearing ring 5, it is not necessary to provide an undercut shape on the fitting surface 2a of the housing 2, and thus the housing 2 can be formed easily.

In this bearing assembly, the flank face 5c is shaped such that it has a maximum radial depth δ, relative to the radial dimension of the fitting surface 5b separated by the flank face 5c, at the circumferentially central portion of the flank face 5c, and such that the circumferentially farther away from the central portion, the smaller the radial depth is. Thus, reduction in wall thickness of the bearing ring 5 due to the formation of the flank face 5c is minimum.

A prototype of this bearing assembly was prepared to ascertain its creep reducing effect. The rolling bearing 3 of the prototype corresponds to Model No. 6208 which the applicant uses. Angle α, see FIG. 3, which defines the circumferential length of the flank face 5c, was set at 35°, while the maximum radial depth δ was set at 0.5 mm. The test was conducted with the maximum radial load F, see FIG. 1, as a unidirectional load of P/C=0.4, where P is the radial load, and C is the basic dynamic load rating. "CVTF" was used as oil for lubricating the rolling bearing 3, and the rolling bearing 3 was lubricated in an oil bath which is barely enough to immerse the lowest rolling element. The temperature condition was, quite roughly, a normal temperature. The prototype was operated under the above-described test conditions, and the outer bearing ring 5 was visually observed to identify any creep of the outer bearing ring 5. No creep was detected. On the other hand, when a comparative example which differs from the prototype only in its lack of the flank face 5c was operated under the same test conditions, creep of the outer bearing ring was observed.

In this bearing assembly, the flank face 5c is formed only on the outer bearing ring 5, but the shape and arrangement of the flank face(s) 5c may be altered according to the loading conditions of the bearing assembly, including: whether the load applied is a stationary load or a rotating load; the magnitude of the maximum radial load F; and torque applied to the bearing ring due to contact between the fitting surface of the bearing ring and the fitting surface of the mating member, in the load receiving region. For example, if the shaft and the inner bearing ring are fitted together with a clearance fit, it is only required that the flank face is formed on at least one of the inner bearing ring and the shaft. If the load applied is a stationary load, the flank face may be formed only on the mating member, or two such flank faces may be formed, respectively, on the bearing ring and the mating member to define a required radial gap between the two opposed flank faces.

Figure 5:
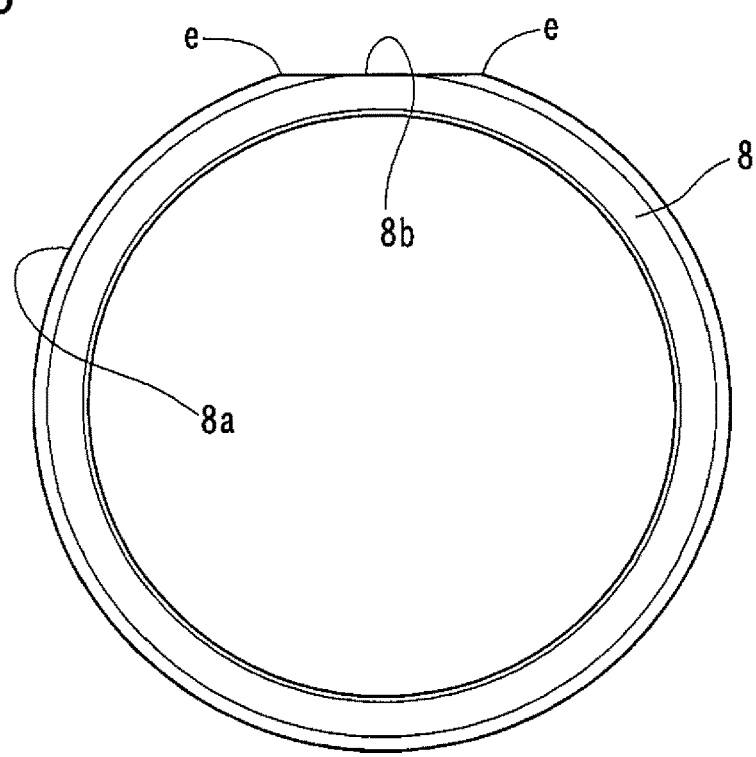
FIG. 5 is a front view showing a flank face according to a second embodiment of the present invention.

In this bearing assembly, in order to minimize a reduction in wall thickness of the bearing ring 5 due to the provision of the flank face 5c, the flank face 5c has a substantially circular arc shape. However, for this purpose, the flank face may have a different shape. FIG. 5 shows a second embodiment in which the flank face has such a different shape. In the following, only what differs from the first embodiment is described The bearing assembly of the second embodiment has a flat flank face 8b which continuously extends between both circumferential ends e of the fitting surface 8a of a bearing ring 8. Because the radial depth of this flank face 8b is smaller at positions closer to the respective circumferential ends e, it is possible, in this embodiment too, to minimize the amount of reduction in wall thickness of the bearing ring 8.

Figure 6:
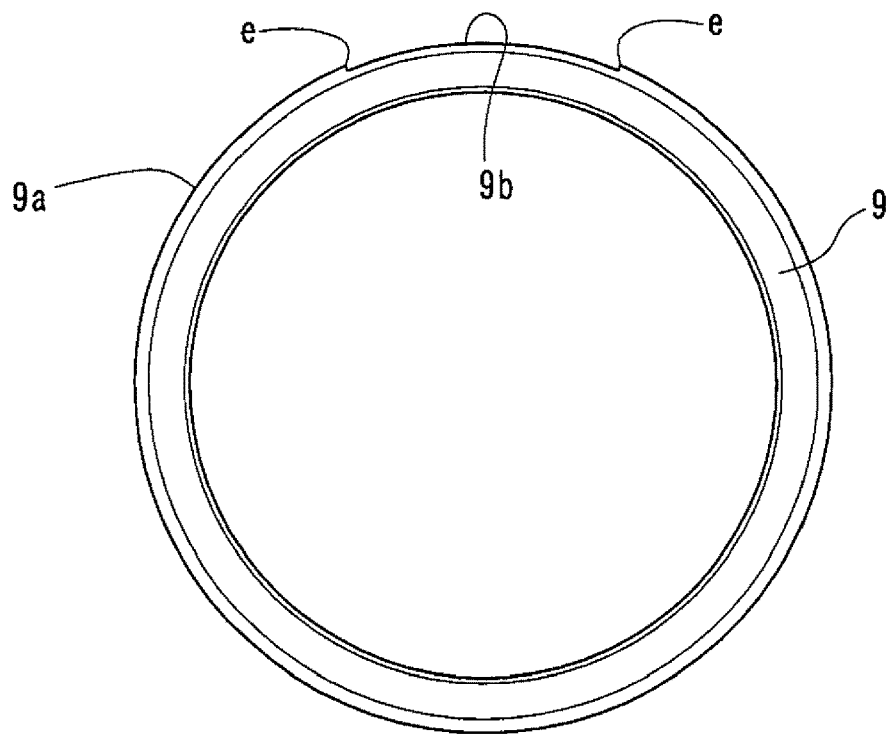
FIG. 6 is a front view showing a flank face according to a third embodiment of the present invention.

If a reduction in wall thickness due to the formation of the flank face is not a big problem, the flank face may have substantially uniform radial depths along the entire circumferential length thereof. The third embodiment shown in FIG. 6 is such an example.

The bearing assembly of the third embodiment has a flank face 9b which is radially recessed, like steps, from both circumferential ends e of the fitting surface 9a of a bearing ring 9. Along substantially the entire circumferential length thereof, the flank face 9b is a circular arc-shaped surface extending in the direction parallel to the fitting surface 9a.

Each of the two circumferential ends of the flank face 9b form a step radially extending toward the corresponding circumferential end e of the fitting surface 9a. Because the flank face 9b of the third embodiment has a maximum radial depth along the entire circumferential length thereof, foreign objects are less likely to accumulate in the above-described radial gap.

Figure 7:
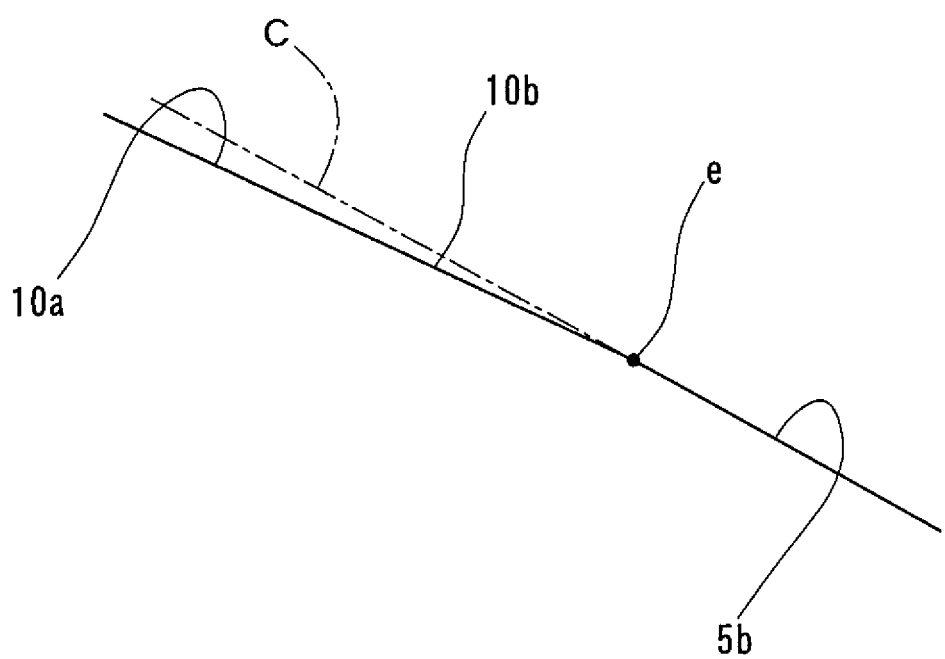
FIG. 7 is a partial front view of and around an end portion of a flank face according to a fourth embodiment of the present invention.

In each of the above embodiments, if the boundaries between the flank face and the circumferential ends of the fitting surface separated by the flank face are defined by linear corners, the contact surface pressure between the flank face and the fitting surface of the mating member at the boundaries will be excessive, which is not preferable. Thus, in order to reduce the surface pressure at the boundaries, it is preferable that the flank face and the fitting surface separated by the flank face are smoothly and continuously connected to each other. The language "smoothly and continuously connected" means that the boundaries are free of ridge-like corners. The fourth embodiment shown in FIG. 7 is such an example.

The flank face of the fourth embodiment comprises a circular arc-shaped surface portion 10a which is the same as the flank face of the first embodiment except that its circumferential length is slightly shorter, and end portions 10b each extending continuously between the circular arc-shaped surface portion 10a and a corresponding circumferential end e of the fitting surface 5b. Each end portion 10b of the flank face is shaped such that the rate at which its radial depth changes per unit circumferential length is lower than the corresponding rate of the circular arc-shaped surface portion 10a, and so as to be smoothly and continuously connected to the circumferential end e. Because the end portions 10b of the flank face of the fourth embodiment are smoothly and continuously connected to the fitting surface 5b separated by the flank face, it is possible to reduce the contact surface pressure between the boundaries of the fitting surface 5b of the bearing ring (i.e., positions of the circumferential ends e) and the mating member.

In the example shown, each end portion 10b of the flank face is composed of a single circular arc-shaped surface having a particularly small radius of curvature, but is not limited thereto. For example, each end portion 10b may be composed of a plurality of curved surfaces or may have a crowning shape in the form of a curved surface defined by a logarithm function. The fourth embodiment is a modification of the first embodiment in which the end portions 10b of the flank face differs from the first embodiment. The second and third embodiment may also be modified by changing the shape of the end portions of the flank face so as to be smoothly and continuously connected to the fitting surface. For example, if the ends of the flank face form steps as in the third embodiment, by rounding the ends of the flank face, it is possible to smoothly and continuously connect the ends of the flank face to the respective circumferential ends of the fitting surface.

It is to be understood that the present invention is not limited to the embodiments disclosed herein. The scope of the present invention is defined not by the above description but by the claims, and the present invention covers every modification within the claimed range and within the equivalent range of the claims.

DESCRIPTION OF THE NUMERALS

1. Shaft
2. Housing
2a. Fitting surface
3. Rolling bearing
4. Inner bearing ring
5. Outer bearing ring
5b, 8a, 9a. Fitting surface
5c, 8b, 9b. Flank face

What is claimed is:

1. A bearing assembly comprising:
    a shaft,
    a housing surrounding the shaft, and
    a rolling bearing disposed between the shaft and the housing,
    wherein one of the shaft and the housing is a mating member, the rolling bearing includes a bearing ring fitted to the mating member with a clearance fit, and each of the bearing ring and the mating member has a fitting surface extending in a circumferential direction,
    wherein at least one of the bearing ring and the mating member has a flank face that separates the fitting surface of the at least one of the bearing ring and the mating member across an entire width of the fitting surface, and
    wherein the flank face is formed such that a radial gap remains between the bearing ring and the mating member in a load receiving region when a maximum radial load within a range of radial loads applied to the rolling bearing is applied.

2. The bearing assembly of claim 1, wherein only the bearing ring has the flank face.

3. The bearing assembly of claim 2, wherein the mating member is the housing.

4. The bearing assembly of claim 3, wherein the flank face is shaped such that a radial depth of the flank face relative to a radial dimension of the fitting surface separated by the flank face is largest at a circumferentially central portion of the flank face, and such that the circumferentially farther away from the circumferentially central portion, the smaller the radial depth is.

5. The bearing assembly of claim 4, wherein the flank face is smoothly and continuously connected to the fitting surface separated by the flank face.

6. The bearing assembly of claim 3, wherein the flank face is smoothly and continuously connected to the fitting surface separated by the flank face.

7. The bearing assembly of claim 2, wherein the flank face is shaped such that a radial depth of the flank face relative to a radial dimension of the fitting surface separated by the flank face is largest at a circumferentially central portion of the flank face, and such that the circumferentially farther away from the circumferentially central portion, the smaller the radial depth is.

8. The bearing assembly of claim 7, wherein the flank face is smoothly and continuously connected to the fitting surface separated by the flank face.

9. The bearing assembly of claim 2, wherein the flank face is smoothly and continuously connected to the fitting surface separated by the flank face.

10. The bearing assembly of claim 2, wherein the bearing ring has a raceway surface, and the flank face has a maximum radial depth $\delta$ which satisfies a relation: $0.005H \leq \delta \leq 0.1H$, where H is a minimum radial wall thickness of the bearing ring between the raceway surface and the fitting surface of the bearing ring.

11. The bearing assembly of claim 10, wherein the maximum radial depth $\delta$ satisfies a relation: $0.01H \leq \delta \leq 0.05H$.

12. The bearing assembly of claim 11, wherein the rolling bearing includes a plurality of rolling elements, wherein the flank face has a circumferential length defined by an angle α around a rotational center axis of the shaft, and wherein the angle α satisfies a relation: $0.5\theta \leq \alpha \leq \theta$, where $\theta$ is a pitch angle between the rolling elements.

13. The bearing assembly of claim 2, wherein the rolling bearing includes a plurality of rolling elements, wherein the flank face has a circumferential length defined by an angle α around a rotational center axis of the shaft, and wherein the angle α satisfies a relation: $0.5\theta \leq \alpha \leq \theta$, where $\theta$ is a pitch angle between the rolling elements.

14. The bearing assembly of claim 1, wherein the flank face is shaped such that a radial depth of the flank face relative to a radial dimension of the fitting surface separated by the flank face is largest at a circumferentially central portion of the flank face, and such that the circumferentially farther away from the circumferentially central portion, the smaller the radial depth is.

15. The bearing assembly of claim 14, wherein the flank face is smoothly and continuously connected to the fitting surface separated by the flank face.

16. The bearing assembly of claim 1, wherein the flank face is smoothly and continuously connected to the fitting surface separated by the flank face.

* * * * *